Aug. 18, 1931.  L. K. WRIGHT  1,819,452
VALVE
Filed Dec. 3, 1927
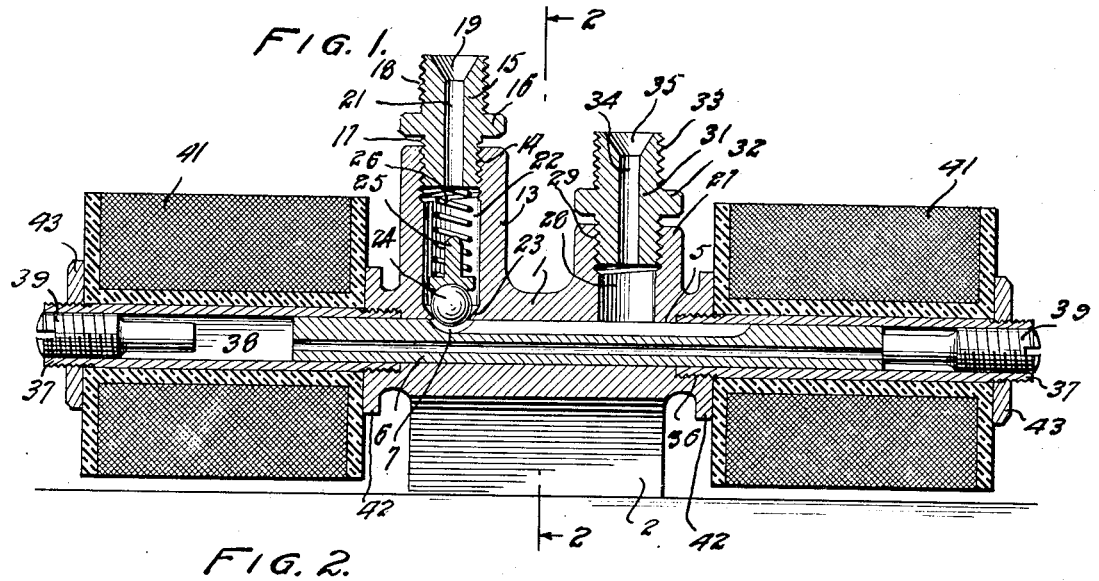
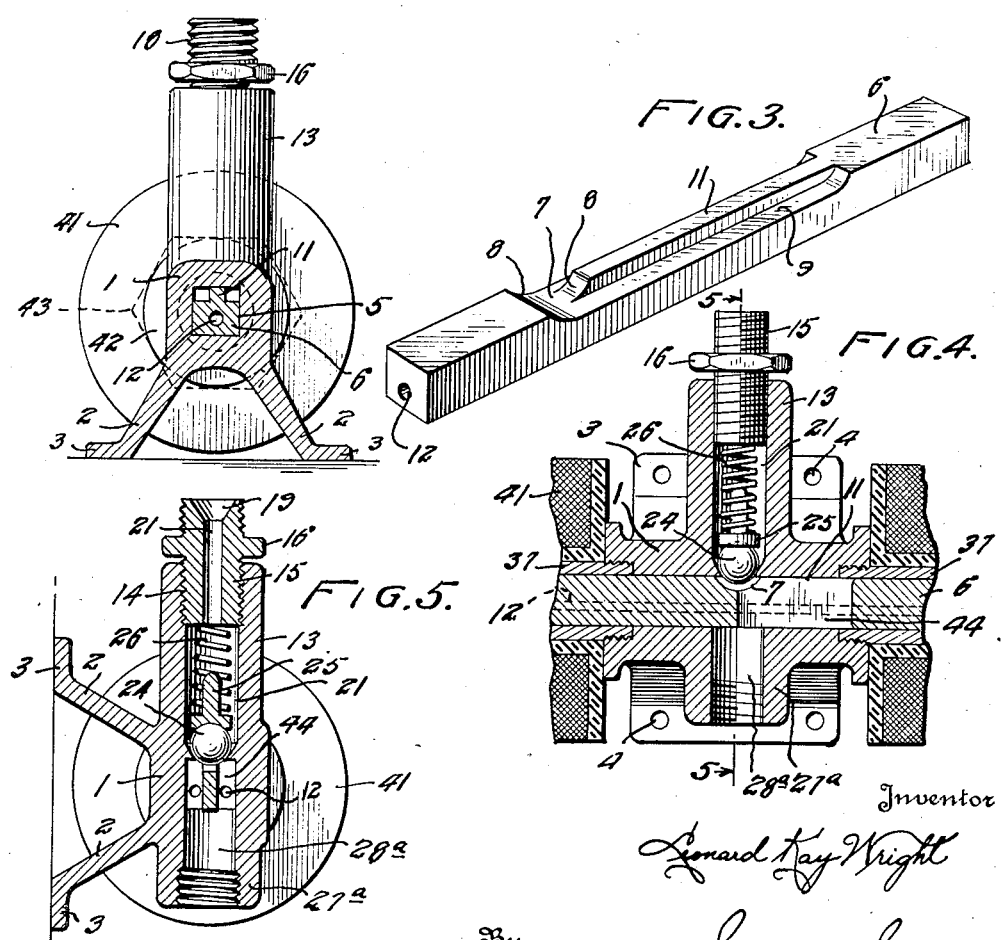
Inventor
Leonard Kay Wright
By Semmes & Semmes
Attorney Patented Aug. 18, 1931

1,819,452

UNITED STATES PATENT OFFICE

LEONARD KAY WRIGHT, OF JACKSON HEIGHTS, NEW YORK

VALVE

Application filed December 3, 1927. Serial No. 237,517.

This invention relates to valves, and more particularly has reference to a valve of the automatic type.

Difficulty has been experienced in the valves heretofore used in that quick and positive closures of the valves has frequently not been possible. Other valves have contained an undue number of parts and considerable wear has taken place at the valve seat. It has also been extremely difficult to obtain a valve, particularly for operation in a refrigerating apparatus, that has been entirely satisfactory over a long period of operation.

An object of my invention is to provide a valve.

Another object is to provide an automatic valve having a minimum number of parts and a valve that may be controlled at a distance.

A further object is to provide a valve that has a quick and positive closure.

A still further object is to provide a self-containing and leak-proof valve.

And yet another object is to provide a valve that requires no force from a fluid to operate it.

To accomplish the above and other important objects as will more fully appear, my invention in general comprises a valve having an inlet and an outlet, and automatic means for regulating the passage of a fluid from the inlet to the outlet.

Reference is made to the accompanying drawings in which similar numerals indicate corresponding parts, with a distinct understanding, however, that various modifications may be made in the embodiment therein set forth without exceeding the scope of the appended claims.

Figure 1 is a longitudinal view in section of a complete valve.

Fig. 2 is a sectional view along the line 2—2 of Figure 1 looking in the direction of the arrows.

Fig. 3 is a view in perspective of a sliding member.

Fig. 4 is a longitudinal sectional view in detail of a modified form of valve.

Fig. 5 is a sectional view of the valve shown in Fig. 4 along the line 5—5 of Fig. 4, looking in the direction of the arrows.

Referring in more detail to the drawings, there is shown in Figure 1 a body member 1, supported by feet 2. As shown in Fig. 2 the feet 2 are provided with flanges 3 which are provided with apertures 4 as shown in Fig. 4. The apertures 4 are adapted to receive screws, bolts, or other suitable fastening means.

As shown in Fig. 2 the body portion 1 is substantially rectangular, although, of course, a different shape may be substituted under appropriate conditions. Within the body portion 1 there is a channel 5 running longitudinally through the member. This channel 5 is square in section, and there slidably fits in the channel a rectangular member 6, movement of which allows or prevents the passage of gas or liquid through the valve.

In Fig. 3, there is a detailed view in perspective of the sliding member 6, in which there is shown an indent 7, rounded as at 8, in the top of the member. There are also recessed portions 9 on either side of the member leaving a fin 11 extending on top of the member to the indent 7. It is, of course, essential that the major length of the member 6 be rectangular and take the shape of the channel 5, although the ends of the sliding member may be cylindrical, the reason therefor appearing hereinafter. A channel 12 extends the length of the member, and is adapted to permit the passage of a gas therethrough.

The body portion 1 is provided with an inlet 13 threaded on its interior as at 14. Within the inlet there is enthreaded a section of pipe 15 provided with a flat shoulder 16, suitable for engagement by a wrench or spanner. Threads 17 on the lower portion of the section 15 are adapted to engage the threads 14 on the interior of the inlet, and threads 18 on the upper exterior of the section 15 engage threads of a coupling, union, flared coupling nut, or a supply pipe, not shown. The channel 21 may be tapered as at 19 when copper tubing is connected to the valve. The channel 22 of the inlet is tapered as at 23, providing a seat for a ball 24. The ball 24 is normally held securely in the seat 23 by a ball guide 25 and a helical spring 26, closing the inlet to any passage of fluid therethrough. The spring 26 is held compressed by the base of the section 15 and the ball guide 25.

The fin 11 is in the same vertical plane with the lowest portion of the ball 24. When the member 6 is so positioned in the channel 5 that the indent 7 is directly beneath the seat 23, the ball 24 rests firmly in the seat, preventing the passage of a fluid. When the member 6 is moved to the left from such position, however, the ball 24 is forced upwardly from the seat, permitting fluid to pass through. The recesses 9 allow the gas or liquid to flow therein. When the member 6 is returned to the position shown in Figure 1 the spring 26 forces the ball 24 into the seat 23 again. It will be seen that the pressure of the fluid assists in maintaining a tight seal.

The body portion 1 is also provided with an outlet 27. The channel 28 of the outlet is enthreaded on the interior as shown at 29, and a section 31 is enthreaded therein. The section 31 is provided with a faced shoulder 32, similar to the shoulder 16 on the section 15, and exterior threads 33 adapted to engage corresponding threads on a discharge pipe or appropriate coupling means for a discharge pipe. Channel 34 of the section 31 has a slanting outlet 35 similar to the flare 19.

The recesses 9 of the sliding member 6 extend along the length of the member so that when the ball 24 is removed from its seat, a gas or liquid may flow from the inlet channel 22 past the seat 23 and along the channels formed by the recesses 9 to the outlet channel 28.

The channel 5 of the body portion 1 is enlarged at each end and threaded as at 36. Enthreaded in such enlarged portions are tubes 37 having channels 38 of substantially the same size as the channel 5 of the body portion. The tubes 37 should be composed of soft iron, stainless steel, or some material that would be impervious to the liquid or gas used, and at the same time forms little resistance to magnetic lines of force. The free ends of the tubes 37 should be enthreaded and adapted to receive stops 39 having corresponding threads. These stops 39 are screwed into the tubes to limit the movement of the sliding member 6. They are so adjusted that the member 6 can slide no further to the right than shown in Figure 1 and also limit the movement of the member to the left so that the grooves 9 would always be under the outlet 27.

There are inserted over the tubes 37 solenoids 41 which are forced against shoulders 42 on the body portion 1 of the valve, and thus held by means of nuts 43 that are enthreaded on the tubes 37. Suitable insulating means, not shown, may be provided to prevent the flow of lines of magnetic flux into the body of the valve. These means may take the form of paramagnetic substances interposed between the solenoids and the body and between the tubes and the body. When an electric current is sent through either one of the solenoids, magnetic lines of force are set up and permeate the casings 37. This draws the bar 6 to that end of the channel which is magnetized.

Assuming, for instance, that the valve is originally in the position shown in Figure 1, and the left solenoid is energized, the member 6 is pulled to the left, being stopped by the left stop 39. This forces the ball 24 from its seat, and gas rushes through the seat and channels formed by the recesses 9. To close the valve the right solenoid is energized, which draws within itself the member 6. When the indent 7 is directly underneath the inlet, the ball 24 is again forced against the seat.

In Figs. 4 and 5 there is shown a modification of the valve set forth in Figure 1. It will be observed that the valve in Figure 1 has the inlet and outlet on the same side, and is particularly adapted for use on a horizontal base. Should it be necessary to attach the valve to a vertical support the structure shown in Figs. 4 and 5 is preferable. The inlet member 13 may be the same as that shown in Figure 1, but the outlet 27a is shown directly beneath the inlet and on the opposite side of the valve body. The sliding member 6, instead of having recesses 9 is provided with cut-away portions 44 which extend through the entire thickness of the member. It will also be observed that in this form of valve, two channels 12 are provided. An indent 7 is provided as in the case of the other flange, and the fin 11 is retained, so that the operation of the ball 24 is similar to that in the structure shown in Figure 1. The gas on escaping from the inlet channel 22, however, proceeds through the channel 5 to the other side, where it escapes through the outlet channel 28a.

To insure a pressure tight device, it is necessary that the various joints be soldered, or made up with litharge and glycerine, or other suitable material. The composition of the various elements of my device will be determined by the particular conditions of operation—the fluid that it is to regulate, the exposure of the apparatus, and the other conditions of operation to which it will be subjected.

From the foregoing the mode of operation of my device is obvious. The fluid enters the valve through the channel 22, and if the ball 24 rests firmly in the seat 23, none of the gas passes into the valve body. To open the valve the left solenoid is energized and the member 6 is pulled to the left. This forces the ball 24 from its seat and allows the gas to pass into the channel 9 and out of the outlet 28. To close the valve the opposite solenoid is energized and the member 6 is pulled to the right, allowing the ball 24 to be returned to its seat. The magnetic effect is increased by having the ends of the member 6 cylindrical, and materially increases the efficiency of operation. The channel 12, not only makes the member lighter, but also allows gas to pass from one end to the other of the channel 5, preventing any cushion by virtue of the gas in either end being compressed.

It will be observed that this valve may be controlled from a distance, and is particularly adapted for a refrigerating process or other operations where it is undesirable to manually operate a valve. It is provided with a minimum of parts, particularly moving members, and is therefore subjected to little wear, and consequent need of repair and replacement is accordingly reduced to a minimum. The valve is actuated independently of the pressure of the fluid, and lends itself admirably to use with a low pressure fluid. It provides a more rapid and tight closure than is possible in the valves heretofore employed, for the pressure of the fluid aids the spring 26 in firmly seating the ball 24. Its economy of construction and ease of operation are other material advantages.

I am aware that the invention may be embodied in other specific forms without exceeding the spirit or essential attributes thereof, and therefore desire the present embodiment to be considered, in all respects, as illustrative and not restrictive, reference being had to the appended claims rather than to the foregoing description to indicate the scope of my invention.

I claim as my invention:

1. A valve comprising an inlet member, means to normally maintain the inlet closed, means separate from and coacting with the first-mentioned means to open the inlet, said second mentioned means having channels rabbeted therein providing a passage to an outlet member.

2. A valve comprising an inlet member, an outlet member, resilient means to normally maintain the inlet closed, slidable means separate from and coacting with the first-mentioned means to open the inlet, and grooves closed at both ends in the second means.

3. A valve comprising an inlet member, an outlet member, a movable channel from the inlet member to the outlet member, means for normally preventing the passage of a fluid through the channel, and means within the channel for actuating the first-mentioned means.

4. A valve comprising an inlet member, an outlet member, a channel from the inlet member to the outlet member, means within the inlet member for normally preventing the passage of a fluid through the channel, and other means, electrically operated and comprising a part of said channel, for actuating the first-mentioned means.

5. A valve comprising a body portion, a recessed channel in the body portion, an inlet to the channel, an outlet from the channel, resilient means adapted to normally maintain the inlet closed, and magnetically operated means slidable in the channel for actuating the first-mentioned means.

6. A valve comprising a foot portion supporting a body member, a longitudinal channel in the body member, an inlet to the channel, a outlet from the channel, means to normally prevent a passage of fluid through the valve, a member slidable in the channel adapted to actuate the said means, and electric means to actuate the slidable member.

7. A valve for use in a refrigerating apparatus comprising a body portion, a rectangular channel in the body portion, an inlet and an outlet angularly disposed to the channel, a ball adapted to normally maintain the inlet closed, a member slidable in the channel adapted to open the inlet and permit the passage of fluid from the inlet to the outlet, and actuating means for the slidable member.

8. A valve comprising a body member having a channel therein, an inlet member and an outlet member on the same side of the channel, means within the inlet member for normally preventing the passage of fluid through the channel, and means slidable in the channel for actuating the first-mentioned means to permit the passage of fluid from the inlet to the outlet.

9. A self-contained sealed valve comprising an inlet, means for normally maintaining the inlet closed, slidable means coacting with the first mentioned means to open the inlet, rabbeted channels in the second means providing a passage to an outlet member, and means to prevent escape of the fluid except through the outlet.

10. A valve for use in a refrigerating apparatus comprising a body portion, a channel in the body portion, an inlet and an outlet angularly disposed to the channel, a means to normally maintain said inlet closed, a member slidable in the channel having a plurality of longitudinal grooves therein closed at both ends and communicating with said inlet and outlet, and a longitudinal fin between said grooves for opening said inlet closing means, said fin being cut away at one end thereof to permit said closure.

means to close the inlet, and means for actuating said slidable member.

11. A valve for use in a refrigerating apparatus comprising a body portion, a rectangular channel in the body portion, an inlet and an outlet angularly disposed to the channel, a ball adapted to normally maintain said inlet closed, a rectangular member slidable in the channel having a plurality of longitudinal grooves therein closed at both ends and communicating with both said inlet and said outlet, and a longitudinal fin between said grooves for opening said inlet closing ball, said fin being cut away at one end thereof to permit said ball to close the inlet, and electric means for actuating said slidable member.

In testimony whereof I affix my signature.

LEONARD KAY WRIGHT.